United States Patent
Minnich

Patent Number: 5,499,490
Date of Patent: Mar. 19, 1996

[54] AQUA FARMING

[76] Inventor: Walter W. Minnich, 119 Broadmeadows Blvd., Columbus, Ohio 43214

[21] Appl. No.: 224,286
[22] Filed: Apr. 7, 1994
[51] Int. Cl.⁶ ..................................................... A01D 46/00
[52] U.S. Cl. ........................... 56/9; 56/328.1; 56/DIG. 2; 47/4; 47/1.1
[58] Field of Search ................... 56/8, 9, 327.1, 56/328.1, 329, 330, DIG. 2; 47/1 F, 4

[56] References Cited

U.S. PATENT DOCUMENTS

| | | | |
|---|---|---|---|
| 1,862,238 | 6/1932 | Roe et al. | 47/1 F |
| 1,943,152 | 1/1934 | Weiss | 299/52 |
| 3,139,060 | 6/1964 | Dane | 115/12 |
| 3,523,520 | 8/1970 | Evans | 119/51 |
| 3,566,839 | 3/1971 | Hibble | 119/3 |
| 3,757,504 | 9/1973 | Rauth | 56/328 R |
| 3,871,040 | 3/1975 | Marasco | 56/328 R |
| 3,943,688 | 3/1976 | Billings | 56/328 R |
| 4,175,368 | 11/1979 | Scheffler | 56/328 R |
| 5,036,618 | 8/1991 | Mori | 47/1.1 |
| 5,125,223 | 6/1992 | McKenna et al. | 56/328.1 |

FOREIGN PATENT DOCUMENTS 1741662  6/1992  U.S.S.R. .................................. 47/1 F

Primary Examiner—Terry Lee Melius
Attorney, Agent, or Firm—Philip J. Pollick

[57] ABSTRACT

A method of farming in which plants are grown on a land mass adjacent to a body of water so that separated plant parts such as apples fall into the water and are harvested from the water. The land mass is sloped so that the plant parts are encouraged to enter the water. The body of water is contained in uniform canals and can be used for raising aquatic food products such as fish. Locks or a flow tube are used to interconnect water at different levels. Food products are harvested from the water using a boat, a conveyor or a water elevator which has a tube for receiving food product from the water and lifting it to a fluid displacement container using a pressurized fluid. The fluid displacement container reduces the length of fall of food product by providing a liquid surface near the top of the container. As the liquid is displaced by the food product, it leaves the container through a drain located near the top of the container.

51 Claims, 4 Drawing Sheets

AQUA FARMING

BACKGROUND OF THE INVENTION

1. Field of the Invention

This invention relates to a method, harvesting devices and a land-water arrangement for aqua farming. More specifically it relates to growing plants on a land mass adjacent to a body of water so that food product from the plants can be gathered from the water. The body of water may also be used to grow and harvest aquatic plants and animals. The water-harvesting devices include a watercraft food product collector, a water conveyor system, a water elevator and a harvest fluid displacement tank.

2. Background Description

As the agricultural land masses of the world available for farming become more scarce as a result of wind and water erosion and ever increasing population growth and associated urbanization, it is imperative that marginal farm land including swamps and steep hillsides be put to effective agricultural use. Current farming methods require large amounts of capital equipment and labor and typically employ large amounts of fertilizers and insecticides that may cause further problems for wildlife populations. Current mechanical methods of farming often leave bruised and battered edible plant parts. Little, if anything, has been done in agricultural technology to take advantage of the natural balance of plant and animal life in the overall relation of living things, especially the balance between aquatic and land environments.

Although a wide variety of inventions have been developed for the improvement of farming, they typically are directed toward narrow and limited features of a specific process. Seldom do they take into account the various factors that must be integrated to give a complete system of farming with a minimum of negative effects on both the ecology and the harvested food product. The following examples are indicative of the current state of the art in agricultural methodology.

Scheffler (U.S. Pat. No. 4,175,368), Billings (U.S. Pat. No. 3,943,688), Marasco (U.S. Pat. No. 3,871,040) and Rauth (U.S. Pat. No. 3,757,504) are directed at high pressure air streams used to harvest fruit from fruit trees but leave the problem of bruised and damaged fruit as a result of the impact of the fruit on the ground unanswered. Weiss (U.S. Pat. No. 1,943,152) discloses a boat that floats on a system of widely separated water channels to water a large land mass using a floating device with water pump and nozzles.

Hilble (U.S. Pat. No. 3,566,839) discloses a fishpond system for the controlled feeding and sorting of fish, but does not integrate the fish system into an overall system for growing both plants and animals in a way the plants can be harvested that minimizes damage to the food product. Dane (U.S. Pat. No. 3,139,060) teaches the use of a mobile spraying unit for spraying chemicals on bodies of water, while Evans (U.S. Pat. No. 3,523,520) discloses the use of a tractor equipped to discharge fish-feed over a large area of a pond. Mori (U.S. Pat. No. 5,036,618) combines the concepts of fish and plant production into a single system, but does so by using separate air-tight chambers for the fish and plants joined by conduits for carrying oxygen and carbon dioxide between the air-tight chambers.

Although each of these inventions teaches an aspect of plant or animal production, none of them suggest an overall system for growing plants on a land mass in a way that allows a portion of the plant (a plant part such as a fruit, e.g., apples) to be separated from the plant in a manner that allows the plant part to enter and be gathered (harvested) from a body of water, thereby reducing damage to the plant part, and reducing harvesting cost. None of the art suggests the production of both land mass plants and aquatic animals in a system of adjacent land mass and body of water. None of the art suggests the use of the body of water as a source of water for harvesting the land mass plants using a stream of high pressure water. None of the art teaches the harvesting of land mass plant parts from the water using a flotation collecting device, a conveyor system, or a water elevator. None of the art teaches a water displacement tank for the collection of food product with a minimum of damage. Prior to the present invention, all of these agricultural problems had no good, known or obvious solutions.

SUMMARY OF THE INVENTION

It is an object of the present invention to provide a method, land and water manufacture (layout) and associated apparatus of harvesting that utilizes marginal land in a manner that minimizes damage to the plant part product in the harvesting process, lowers fertilization and pest control costs, and preserves and promotes land and water ecology. It is an object of the present invention to prevent undue freeze damage to plants. It is an object of this invention to grow and harvest animal product in combination with the growth and harvest of plant product. It is an object of this invention to utilize both water and land mass in the production of plant and animal crops. It is an object of this invention to use water in harvesting plant parts such as fruit. It is an object of this invention to harvest land mass plant parts from the water. It is an object of this invention to collect plant parts with a minimum of damage. It is an object of this invention to use a body water as a means to move and collect plant product. It is an object of this invention to use a body of water as a means to remove insects from land mass plants.

This invention is a method of farming that features growing plants on a land mass adjacent to a body of water so that separated plant parts from the plants fall into or are readily moved into the body of water and are then gathered (harvested) from the water. Several advantages are derived from this arrangement. Under frost conditions, the water and water vapor above the body of water requires much more cooling before freezing actually occurs, thereby preventing the plant parts from freezing as quickly as would happen if no water and water vapor were present. By allowing the plant part to fall into the water, bruising and other damage to the plant part is avoided. For example, if apple trees are grown on a long and narrow land mass with canals (channels) on each side of the land mass and the bulk of the tree limbs extend over the water, falling apples will fall directly into the water, avoiding bruising contact with the land. Another feature of this invention is the use of a land mass that slopes to the water. This has the advantage of allowing the plant parts to enter the water as a result of gravitational force. In the case of apples, those few apples that do no fall directly into the water will roll down the slope and into the water. As such, most if not all of the fruit from the tree will have entered the water without human intervention. To further minimize the damage to falling plant parts, grass is grown on the land mass to provide a cushion for those plant parts that do not fall directly into the water. Although plant parts such as fruits and vegetables can be allowed to fall from the plants into the water as part of the natural ripening process, another feature of this invention is the use of a pressurized fluid such as pressurized water or a pressurized air-water stream to remove fruit and vegetables from the plant. This has the advantage of shortening harvest time, and also allows the collection of a much greater portion of the plant part then if the plant part were allowed to ripen and fall naturally from the plant. The water or air-water stream can also be used to remove insects from the plants at times other than harvest time. The use of a water or water-air stream for insect removal has the advantage of avoiding costly and environmentally detrimental insecticides. Moreover, when animals such as fish are raised in the body of water as an additional feature, the insects that fall from the plants, like the plant parts, also tend to fall into the water where they advantageously serve as food for the fish.

Another feature of this invention is the use of canals that are relatively straight and of uniform width. This has the advantage of allowing for the use of a flotation device such as a pontoon boat for the collection of plant parts such as fruit and animals such as fish from the water. The floatation device also advantageously serves as a platform for machinery to provide a water or air-water stream for removing plant parts and insects from the plants, with the water for the stream being provided directly from the canal.

Another feature of this invention is the use of wheels mounted to and extending from the sides of the pontoon boat at the front and back so as to contact the sides of the canal. This has the advantage of maintaining the boat centered in the canal and keeps operator steering to a minimum, allowing the operator to concentrate fully on agricultural operations such as removing fruit or insects, or collecting food product such as fruit or fish. As used here, the term food product is defined as any animal or plant product grown by the method of this invention. Although the animal or plant products are generally used for food, it is intended that this term also include other uses of all or portions of either the plant or animal, including fertilizers, animal food, chemicals, and so forth.

This invention features the use of a watercraft with a food product collector for harvesting either plant parts or animals from the body of water. In another embodiment of the food product collector, a conveyor system is used for gathering the plant parts or animals from the body of water. This has the advantage of allowing the plant parts or animals to be collected with a minimum of collection effort. In yet a third embodiment of the food product collector, a liquid elevator is used to remove food product from the body of water. The liquid elevator features the use of a tube whereby the plant parts or animals are "drained" from the body of water into the tube and then conveyed upward by means of a pressurized fluid into a suitable collection container. As used here, the term pressurized fluid means a liquid under pressure, or a compressed gas, or both. The water elevator has the advantage of eliminating many of the mechanical parts associated with a conveyor, and allows for a simple and straightforward conveyance of the plant parts or animals to a collection container without contact by moving mechanical hardware that may damage the food product. Both the conveyor and water elevator are used with a collector (collection tray) that directs the produce or animals to a loading point for the conveyor or water elevator. The collection tray is further equipped with a moveable ramp for collecting floating or submersed materials. By lowering the front portion of the ramp just below the surface of the water, only floating materials such as apples, are collected in the collection tray, while submersed materials, such as fish, pass below the collection ramp. If the ramp is lowered to the bottom of the body of water, the submersed materials such as fish are collected.

This invention also features the use of a rotating paddle wheel to provide a circulating water stream in the body of water, especially when the body of water is arranged in canals and channels. This has the advantage of circulating the water and allowing the plant parts and animals to be moved to the loading conveyor or water elevator. The paddles of the paddle wheel feature the use of holes in each paddle. This has the advantage of providing a means of aeration of the body of water.

This invention also features a screen or series of horizontal bars across the direction of water flow produced by the paddle wheel. This has the advantage of allowing easy collection of debris from the body of water as the water is swept between the opening in the screen or bars. Typically the screen or bars are arranged so as to allow the passage of plant parts and animals through them.

Another feature of this invention is the use of a fluid displacement collection tank. The tank or container is filled with water and at least partially open at the top for the deposit of plant parts and animals. As the plant parts and animals enter the container, the water is displaced and flows from a displacement aperture located just below the top of the container. The displacement tank offers the advantage of offering a "soft" liquid collection surface that prevents damage to plants and animals. Because the landing surface is close to the food-product discharge point, the momentum and resulting damage from a long fall are reduced considerably. As additional plant parts or animals are added, the water continues to flow out through the displacement aperture, leaving a container that is filled with produce or animals such as fish. The remaining water in the tank tends to support the weight of the food product which has the advantage of lessening crushing and bruising of the food product during transport. A displacement tank features an upper unloading drain located just below the displacement aperture. This has the advantage of allowing buoyant food product such as apples to be unloaded by adding water to the displacement tank and allowing the food product to float out through the upper unloading drain. A lower unloading drain allows for dense food and animal product such as fish to be unloaded from the lower part of the tank. A lifting member such as a set of eye bolts are attached to the container for lifting it from the ground to a transport vehicle such as a truck or train car. Typically the tank is positioned on the transport vehicle during loading and unloading of food product.

Another feature of this invention is the use of at least two elevational levels of water and a set of locks or flow tube for communication of the water between the two elevational levels. The use of locks has the advantage of allowing for the using of a single water service vehicle such as a pontoon boat on each of the water elevational levels.

The foregoing and other advantages of the invention will become apparent from the following disclosure, in which one or more preferred embodiments of the invention are described in detail and illustrated in the accompanying drawings. It is contemplated that variations in procedures, structural features and arrangement of parts may appear to a person skilled in the art without departing from the scope of or sacrificing any of the advantages of the invention.

Figure 1:
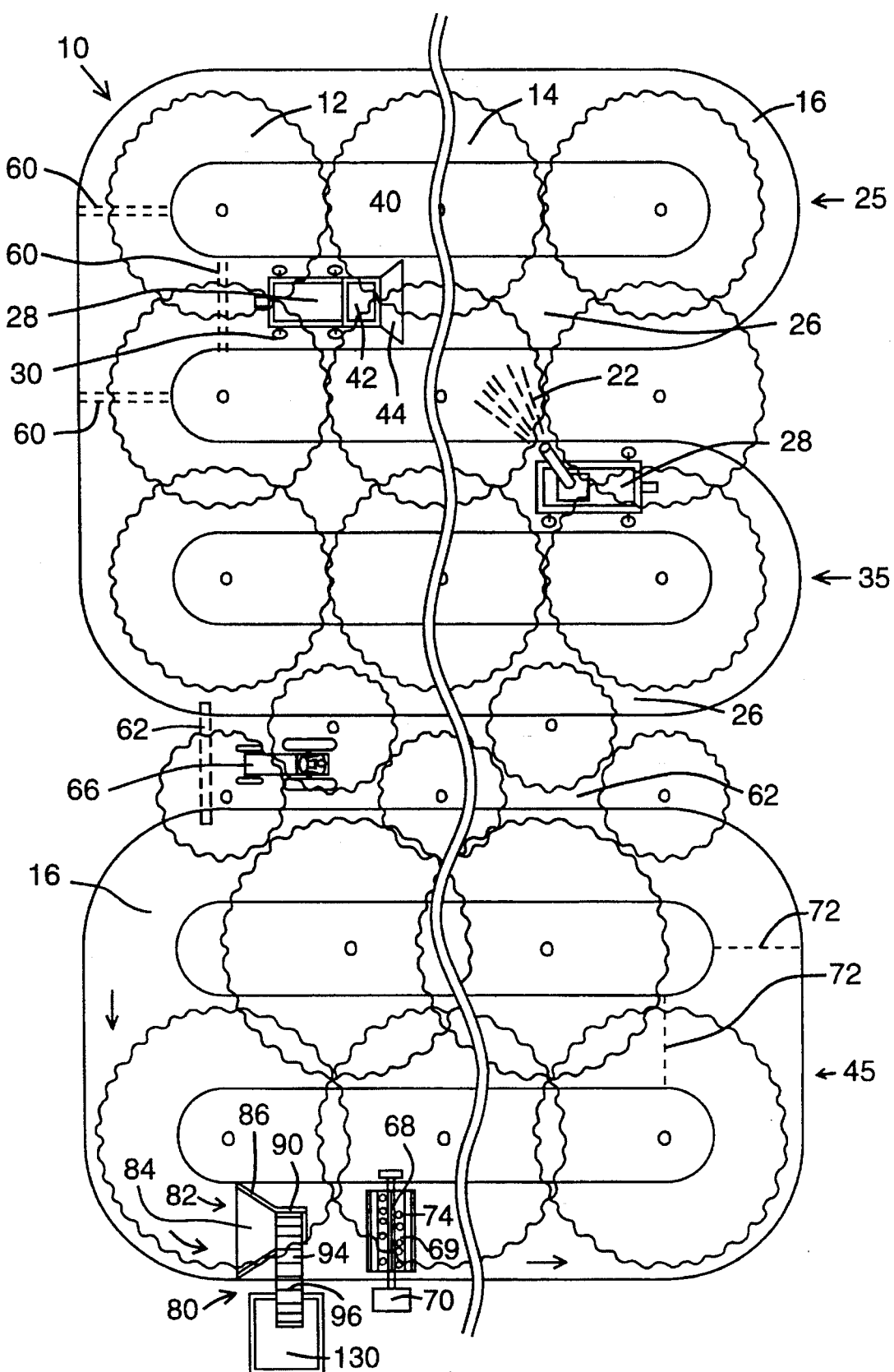
FIG. 1 is a top view of the land mass, vegetation and water arrangement of this invention featuring multiple levels of water elevation.

In describing the preferred embodiment of the invention which is illustrated in the drawings, specific terminology is resorted to for the sake of clarity. However, it is not intended that the invention be limited to the specific terms so selected and it is to be understood that each specific term includes all technical equivalents that operate in a similar manner to accomplish a similar purpose.

Although a preferred embodiment of the invention has been herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalents thereof.

DETAILED DESCRIPTION OF THE INVENTION AND BEST MODE FOR CARRYING OUT THE PREFERRED EMBODIMENT

Figure 2:
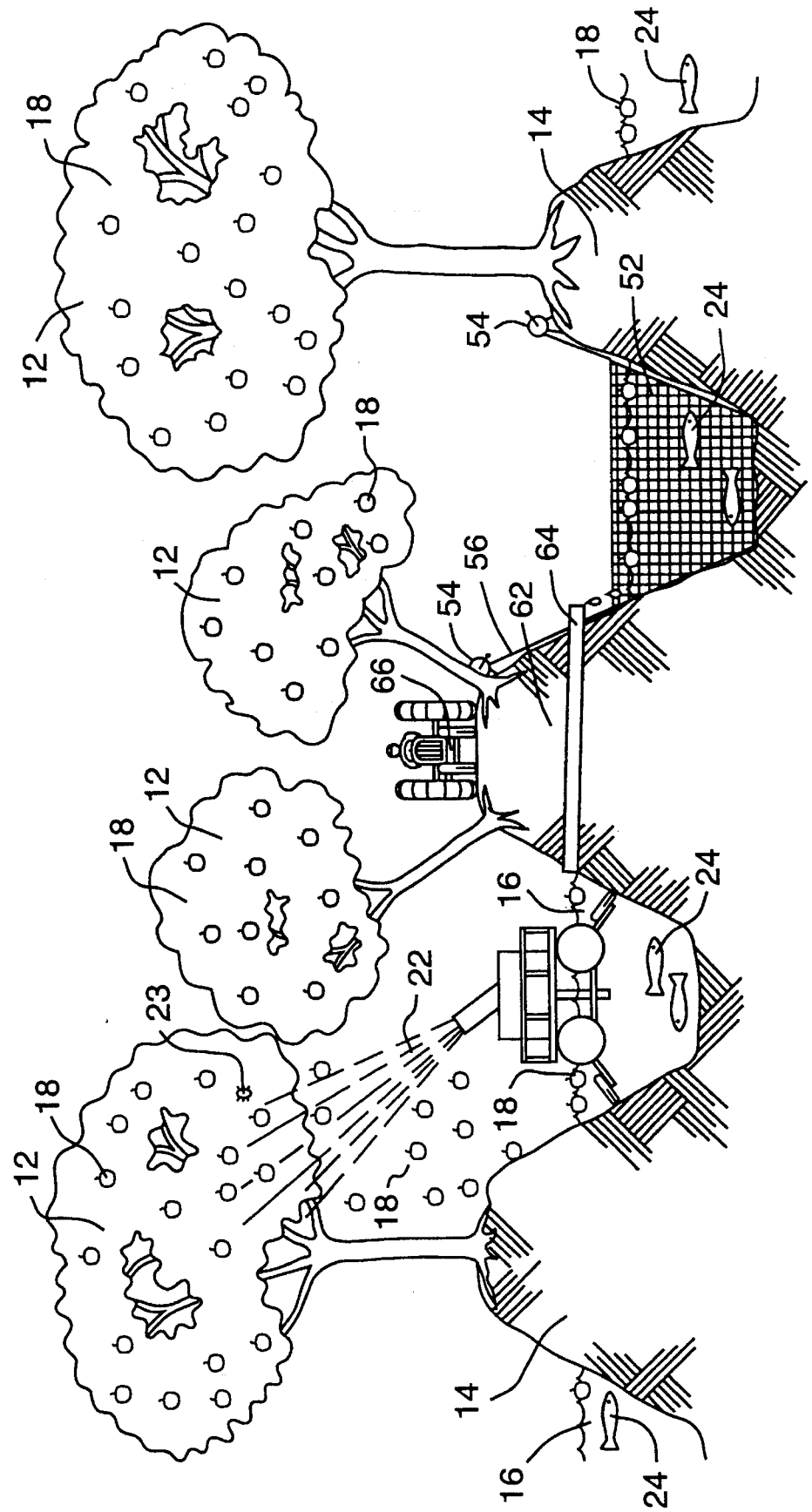
FIG. 2 is an elevational cross section showing the arrangement of water, land and plants and the use of a pontoon boat for the removal of plant parts (apples) and insects from the vegetation using a pressurized fluid stream.

Referring specifically to the drawings and initially to FIGS. 1 and 2, reference number 10 generally refers to an overall layout illustrating the basic features of this invention. In its basic form, the invention consists of an arrangement of adjacent land masses 14 and bodies of water 16 for growing plants such as trees 12. The plants are located on land mass 14 so that separated plant parts such as apples 18 enter into body of water 16 (FIG. 2). The plant parts such as apples 18 are then gathered from the body of water 16.

It is to be realized that although this invention is illustrated with apple trees and apples, that it is adaptable to a wide variety of plants including fruits and vegetables. Furthermore, the plant parts do not have to fall from the plants but may be harvested by cutting or other means of plant part separation that are well known in the art. However, when such plant parts are separated from the plant, it is essential that they enter and be gathered from the water. Also it is not essential that the plant parts initially fall into the water, it being realized that they may be suitably moved into the water by means of conventional moving equipment or through the use of a stream of pressurized fluid such as water under pressure, or compressed air, or both. The plant parts may also be cut in a fashion and/or with equipment that causes them to enter the body of water 18. As shown in FIGS. 1 and 2, the apples 18 are being removed from the trees with a pressurized fluid stream 22. Typically the pressurized fluid is a combination of pressurized water and compressed gas. The pressurized fluid stream 22 may also be used to remove insects 23 from the plants 12. Since most of the insects fall into the water, they provide a good source of food for the fish 24 and other aquatic animals that live in the body of water 16.

As shown in FIG. 2, preferably the land masses 14 are sloped with a slope sufficient to urge the plant parts 18 to enter the water through the force of gravity. As shown in FIGS. 1 and 2, it is desirable for a good portion of the plant to extend out over the water so that most of the plant parts 18 fall directly into the body of water 16. This avoids damage to the plant part as a result of falling to the ground—especially when the plant parts are fruits such as apples, oranges, pears and similar fruits. To further minimize the damage to the small amount of plant part product that falls on the land mass, grass 20 is planted on the land masses to cushion the fall of the plant part and avoid bruising.

As shown in FIG. 2, this invention further comprises raising animals 24 such as fish in the body of water 16 and subsequent collection or harvesting of these animals from their aquatic environment, i.e., body of water 16. Although fish are the aquatic crop of choice, it is to be realized that a wide variety of other aquatic animals may be raised in and around the body of water, including frogs, crustaceans, clams, and so forth. It is also contemplated that aquatic plants may also be grown in the body of water.

Figure 3:
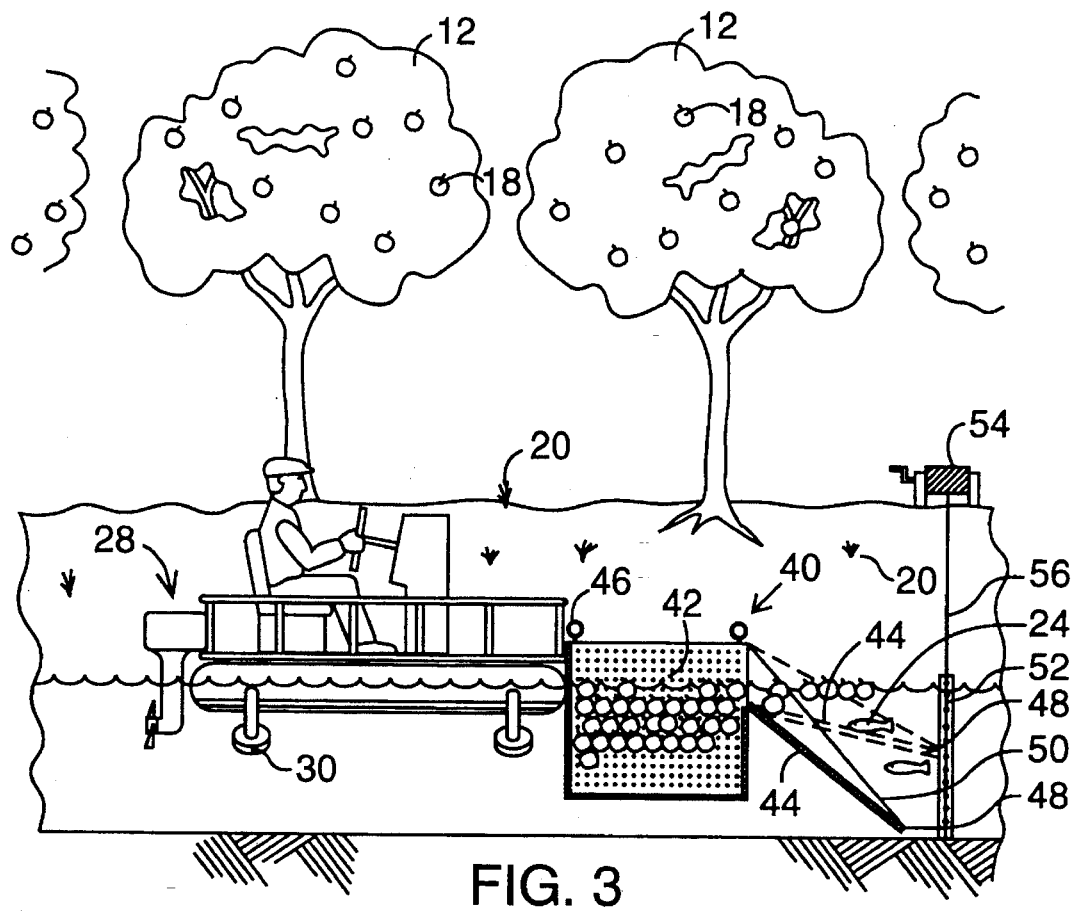
FIG. 3 is an elevational cross section showing the collection of fruit or fish using a pontoon boat with attached collection device.

As seen in FIG. 1, it is desirable that the body of water be fashioned in the form of canals or channels 26 that are located on each side of land mass 14. Although only the essential features of the canals are shown in the Figures, it is to be realized that they can extend for several miles in a manner that conforms to the overall contour of the land. Preferably, canals 26 are of a uniform width that allows a flotation device 28, i.e., a watercraft such as pontoon boat 28 to navigate them with ease. As shown in FIGS. 1–3, pontoon boat 28 is equipped with outwardly projecting wheels 30 that contact the sides of the canals and maintain the pontoon in the center of the canal, leaving the operator free to operate equipment without having to constantly steer the craft or maintain its position.

As seen in FIGS. 1 and 3, a watercraft such as pontoon boat 28 is equipped with a harvest collection device 40 having an at least partially submerged collection basket 42 and a food-product collection ramp 44. Collection ramp 44 is preferably made of a screen-type material to permit the passage of water while retaining the food product. The collection basket 42 and ramp 44 are removeably secured to boat 28 and may be conveniently lifted from boat 28 using eye hooks or bolts 46. As seen in FIG. 3, ramp 44 is pivotally secured to collection basket 42 so that the front edge 48 can be lifted to various positions (shown in phantom) by means of cable 50. When in its lowered position, collection device 40 can be used to collect fish and other submerged harvest products, both plant parts and animals. Ramp 44 typically has sides such as those shown with ramp 84 (FIG. 4) to insure that all of the crop is directed to the collection basket. Typically the collection basket is at least partially constructed of screen or has apertures to facilitate the flow of water through it.

To facilitate the harvesting operation, a screened separator 52 is positioned across the width of the canal to prevent harvest product such as fish 24 from escaping the collection process. As seen, separator 52 can be raised and lowered using a suitable winch 54 and attached line 56. Not only does screen 52 serve as a stop for the collection of harvest product, they may also be used in pairs along the canals to provide segmented canal portions for the growth of various species and sizes of aquatic plants and animals.

As seen in FIGS. 1 and 2, this method of farming is applicable to a body of water at different elevational levels. In the upper portion of FIG. 1, two separate surface elevational levels 25 and 35 are maintained through the use of a system of locks 60 that allow for the service vehicle 28 to operate at two different surface elevational levels of water. However, it is not necessary that locks be used to operate at various elevational levels of water. Rather the two surface elevational levels of water may be completely separated by land mass 62 and the water at a higher level allowed to drain to a lower level 45 by means of a flow member or spill pipe 64. Alternatively, water at two levels may be joined by means of a spillway, which has the further advantage of providing aeration to the water. Multiple spillways may be used for multiple levels of water and arranged so as to provide a moving flow along the complete length of the canals. Spillways are advantageously used when a source of flowing water is readily available.

Although it is possible to provide service and access roads for land vehicles such as tractor 66, preferably plant insect control and harvesting are performed from the water. In addition to harvesting using water vehicle 28, it is possible and preferable to harvest the food crops by circulating the water in the body of water. As shown in the lower portion of FIG. 1 and in FIG. 4, a water current can be established using paddle wheel 68 driven by a suitable prime mover such as diesel engine 70. The moving water carries with it the harvest product to be collected. By providing a solid separator 72 that can be lowered and raised such as by winch 54, it is possible to control the water flow through the various canals and selectively harvest individual canals. By incorporating apertures 74 in the paddle 69 of paddle wheel 68, good aeration of the body of water 16 is achieved for aquatic crops.

Figure 4:
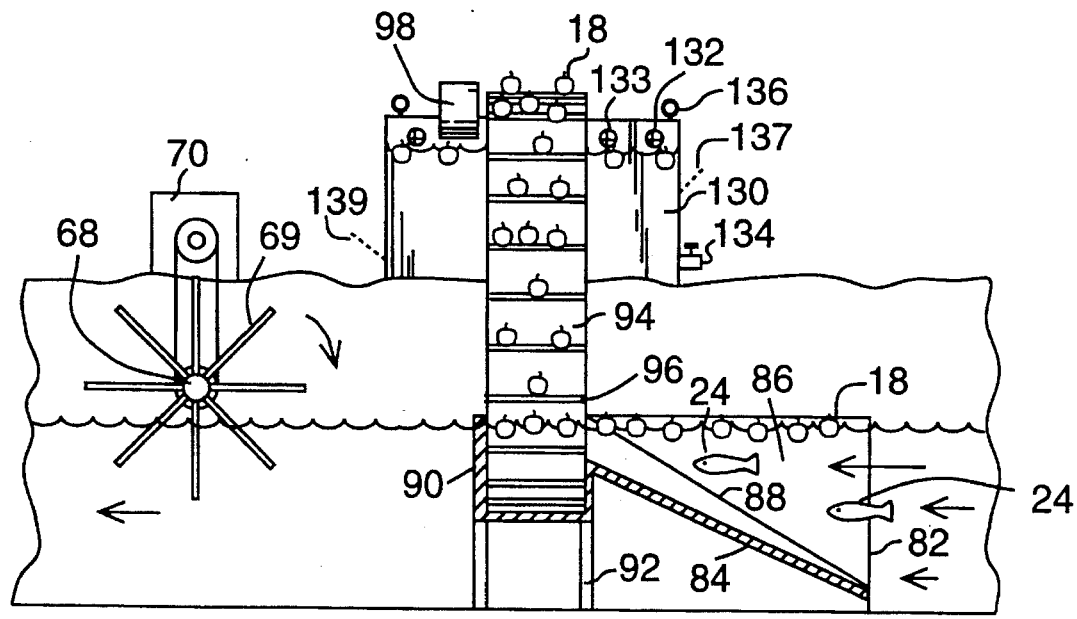
FIG. 4 is an elevational cross section showing the use of a paddle wheel, collector, conveyor and fluid displacement tank for collection of food product from the body of water.
Figure 5:
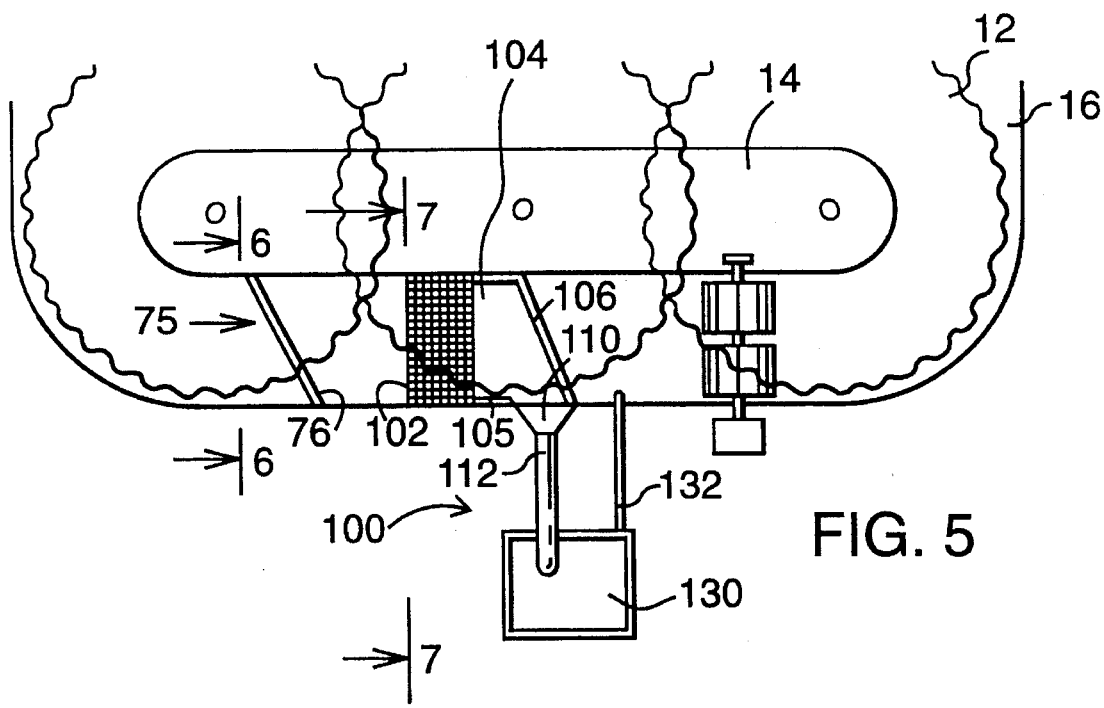
FIG. 5 is a top view illustrating the use of a liquid elevator for collection of food product from a body of water.
Figure 7:
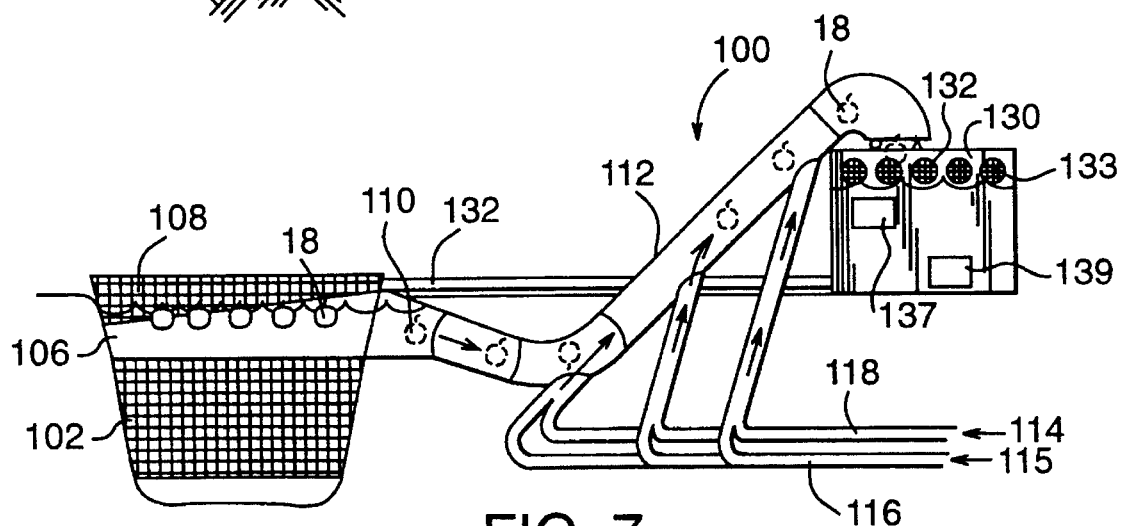
FIG. 7 is a cross-section through 7—7 of FIG. 5.

Harvesting directly from the moving body of water can be accomplished with either a conveyor system 80 (FIGS. 1 and 4) or a water elevator 100 (FIGS. 5 and 7). The conveyor system 80 consists of a ramp 82 having a bottom 84 and sides 86 for collecting harvest from the moving current created by paddle wheel 68. Ramp 82 may be raised and lowered by means of cable 88. Ramp 82 is positioned in a raised position to collect surface or floating harvest crops such as apples 18 while allowing aquatic harvest such as fish 24 to pass beneath ramp 82. When ramp 82 is placed in its fully lowered position, aquatic harvest such as fish can be collected. After the harvest reaches the top of ramp 82, it enters into a collector such as collector tray 90 which is at least partially submerged in the body of water and supported by means of legs 92. The collector tray may also be supported by overhead cables and winches that allow the tray to be removed from the water when not in use or raised or lowered to accommodate varying water levels. A conveyor belt 94 with cross members 96 for holding food product extends into the body of water in the collector and picks up the harvest such as apples 18 and conveys them upward to displacement tank 130. The conveyor belt 94 is a continuous loop operated by engine 98.

Water elevator 100 consists of a ramp 102 similar in construction and operation to ramp 82 used with conveyor system 80. Collector 104 is also similar to collector 90 except that the back 106 of collector 104 is angled to divert the water flow into collection funnel 110. The upper portion of back 106 is constructed of screen 108 to facilitate the passage of water. The first end of collection tube 112 is connected to collector 104 by means of collection funnel 110. Entry into he collection funnel 110 and tube 112 is facilitated by a downward bend in tube 112 to bring the tube completely below the elevation of the surface of the body of water 16. This allows gravity to pull water and harvest into tube 112. Tube 112 then bends upward to allow discharge of water and harvest at a second end into collection tank 130. The upward travel of harvest and water is facilitated by compressed gas 114 and pressurized liquid (liquid under pressure) 115 which are injected into tube 112 by means of second tube 116 and third tube 118. The harvest is discharged from the second end of tube 112 into container 130. Overflow water from container 130 is returned to the canal by means of return tube 132.

Container 130 is more appropriately designated as a fluid displacement tank and is shown in detail in FIGS. 4 and 7. Container 130 is at least partially open at or near the top for receiving food product. Drainage apertures 132 are located slightly below the top of container 130 to allow fluid to leave container 130 as food product is added and displaces the container liquid. The apertures are of such size as to prevent the passage of food product or, alternatively, provided with screening 133 which serves the same purpose. In operation, container 130 is filled with water to just below the apertures 132. By dropping food product into the fluid, unnecessary damage to the food product is reduced considerably. First, the product has only a short distance to fall to the top of the liquid, thereby reducing the momentum of impact. Further the liquid serves to cushion the fall. As the container fills with product, the water drains from the drainage apertures 132, leaving a container full of food product. Remaining liquid is left in tank 130 to serve as a cushion to prevent bruising and crushing of food product. Fish and other animal product can be transported live in container 130 by leaving a sufficient amount of water within container 130. For floating produce, unloading is accomplished by opening upper drain 137 and adding liquid to container 130 to float produce out of unloading drain 137. For non-floating produce, bottom drain 139 is opened and the contents of container 130 allowed to drain out. Lifting eye bolts 136 permit the container to be lifted onto a suitable vehicle for transport or otherwise moved about. Preferably displacement container 130 is located on the transport vehicle and loaded and unloaded from the vehicle. However, it is not necessary that container 130 be used with a transport vehicle.

Figure 6:
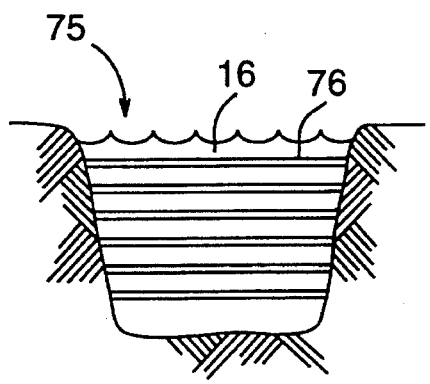
FIG. 6 is a cross-section through 6—6 of FIG. 5.

To prevent large objects such as tree limbs from entering the conveyor system 80 or water elevator 100, it is advantageous to install debris collector 75 across the canal as shown in FIGS. 5 and 6. The debris collector consists of a set of spaced-apart horizontal bars 76 arranged across the canal at an angle to the canal bank. The angle of the bars serves to direct the debris to the bank of the canal where it can be conveniently removed.

It is possible that changes in configurations to other than those shown could be used but that which is shown if preferred and typical.

The present invention may suitably comprise, consist of, or consist essentially of the steps of 1) growing plants on a land mass adjacent to a body of water so that separated plant parts enter the body of water, 2) collecting the plant parts from the body of water, 3) raising animals in the body of water, and 4) collecting the animals from the body of water. The present invention may suitably comprise, consist of, or consist essentially of the elements of 1) a land mass, 2) a body of water, and 3) plants grown on the land mass so that plant parts are received into the body of water. The present invention may suitably comprise, consist of, or consist essentially of a water harvesting device. The invention may also suitably comprise, consist of, or consist essentially of a fluid displacement container. The invention illustratively disclosed herein suitably may be practiced in the absence of any element which is not specifically disclosed herein.

It is therefore understood that although the present invention has been specifically disclosed with the preferred embodiment and examples, modifications to the design concerning sizing and shape will be apparent to those skilled in the art and such modifications and variations are considered to be equivalent to and within the scope of the disclosed invention and the appended claims.

I claim:

1. A method of farming comprising the steps of;
   a) planting and growing plants on a land mass adjacent to a body of water;
   b) separating plant parts from said plants,
   c) moving said plant parts into said body of water; and
   d) gathering said plant parts from said body of water.

2. The method according to claim 1 wherein said moving step is carried out by providing said land mass with a slope sufficient to move said plant parts into said body of water as a result of gravitational force.

3. The method according to claim 1 where in said plants are fruit plants.

4. The method according to claim 1 wherein said step of separating plant parts from said plants occurs as a result of gravitational force.

5. The method according to claim 1 wherein said plant parts are fruit.

6. The method according to claim 1 wherein said fruit are apples.

7. The method according to claim 1 further comprising the steps of:
   a) raising food product in said body of water and
   b) collecting said food product from said body of water.

8. The method of claim 7 wherein said food product is animal.

9. The method of claim 8 wherein said animal is fish.

10. The method according to claim 1 further comprising the step of growing grass on said land mass.

11. The method according to claim 1 wherein said step of separating said plant parts from said plants is carried out with a pressurized fluid.

12. The method according to claim 11 wherein said plant parts are apples.

13. The method according to claim 1 further comprising the step of removing insects from said plants with a pressurized fluid.

14. The method according to claim 1 further comprising the step of collecting debris from said body of water with a debris collector.

15. The method according to claim 1 wherein said step of gathering plant parts from said body of water is carried out with a flotation device.

16. The method according to claim 15 with said flotation device having an attached harvest collection device comprising a collection basket attached to said floatation device and a collection ramp attached to said basket.

17. The method according to claim 1 wherein said step of gathering said plant parts from said body of water is carried out with a conveyor.

18. The method according to claim 1 further comprising the step of conveying said plant parts from said water to a fluid displacement collection tank.

19. The method according to claim 1 wherein said step of gathering said plant parts from said water is carried out with a liquid elevator using a pressurized fluid.

20. The method according to claim 1 further comprising the step of circulating water in said body of water.

21. The method according to claim 1 further comprising the step of aerating said water.

22. A liquid elevator comprising:
   a) a stationary collector at least partially submerged in a body of water for collecting food product from said body of water;
   b) a first tube attached at a first end to said collector for conveying food product in a liquid medium from said collector in an upward direction for discharge at a second end; and
   c) a second tube attached and open to said first tube and positioned to direct a pressurized fluid in an upward direction in said first tube.

23. The liquid elevator according to claim 22 further comprising a third tube connected to said first tube for directing a second pressurized fluid in an upward direction in said first tube.

24. The liquid elevator according to claim 23 wherein said third tube is connected to said first tube by means of said second tube.

25. The liquid elevator according to claim 22 wherein said first tube bends downward so that a portion of said first tube is completely below the elevation of the surface of said body of water.

26. The liquid elevator of claim 22 with said collector having an attached ramp for diverting food product from said body of water into said collector.

27. The liquid elevator of claim 26 with said ramp further comprising a raising and lowering means for collecting food product at different elevational levels from said body of water.

28. A aqua-farming manufacture comprising:
   a) a plurality of elongated land masses;
   b) a plurality of elongated bodies of water juxtaposed between said elongated land masses;
   c) plants planted and grown on said land masses;
   d) said elongated land masses sized and shaped to allow detached plant parts from said plants to enter into said bodies of water as a result of gravitational force.

29. The aqua-farming manufacture according to claim 28 wherein said plants are apple trees and said plant parts are apples.

30. The aqua-farming manufacture according to claim 28 wherein said elongated land masses slope sufficiently to allow said plant parts to enter into said bodies of water as a result of said gravitational force.

31. The aqua farming manufacture according to claim 28 wherein said bodies of water are canals of uniform width.

32. The aqua-farming manufacture according to claim 28 further comprising a rotating paddle wheel for circulating water in said bodies of water.

33. The aqua-farming manufacture according to claim 32 wherein the paddles of said rotating paddle wheel have apertures for water aeration.

34. The aqua-farming manufacture according to claim 28 wherein the surfaces of said bodies of water have at least two different elevational levels.

35. The aqua-farming manufacture according to claim 35 further comprising locks for separating said bodies of water with different surface elevational levels.

36. The aqua-farming manufacture according to claim 35 further comprising a land mass separating said bodies of water with different surface elevational levels and a water flow member for the flow of water from a body of water with a first surface elevational level to a body of water with a lower surface elevational level.

37. The aqua-farming manufacture according to claim 28 wherein portions of said bodies of water are separated by a separator.

38. The aqua-farming manufacture according to claim 37 wherein said separator is a screen.

39. The aqua-farming manufacture according to claim 28 further comprising a water harvesting device for collecting food product from said bodies of water.

40. The aqua-farming manufacture according to claim 39 with said water harvesting device comprising a flotation device, a collection basket attached to said flotation device, and a collection ramp attached to said collection basket.

41. The aqua-farming manufacture according to claim 39 said water harvesting device comprising a collector for collecting food product from said bodies of water and a conveyor with one end extending into said collector for conveying said food product to a collection tank.

42. The aqua-farming manufacture according to claim 39 with said water harvesting device comprising:
   a) a collector for collecting food product from said bodies of water;
   b) a first tube attached at a first end to said collector for conveying food product from said collector in an upward direction for discharge at a second end; and
   c) a second tube attached and open to said first tube and positioned to direct a pressurized fluid in an upward direction in said first tube.

43. The aqua-farming manufacture according to claim 28 wherein said bodies of water are interconnected.

44. The aqua-farming manufacture according to claim 40 with said collection tank comprising a container for holding a fluid, said container comprising:
   a) an opening above said fluid for receiving food product; and
   b) a fluid displacement drain aperture near the top of said container to allow said fluid to drain from said container while retaining said food product.

45. The aqua-farming manufacture according to claim 44 with said tank having an upper drain immediately below said fluid displacement drain aperture.

46. The aqua-farming manufacture according to claim 44 with said tank having a lower drain near the bottom of said displacement tank.

47. A conveyor system for harvesting food product from a body of water comprising:
   a) a collector at least partially submerged in a body of water to receive food product directly from said body of water;
   b) a conveyor belt with a first end extending into said body of water in said collector for conveying food product from said collector in an upward direction for discharge at a second end.

48. The conveyor system of claim 47 with said collector having an attached ramp for diverting food product from said body of water into said collector.

49. The conveyor system of claim 48 with said ramp further comprising a raising and lowering means for collecting food product at different elevational levels in said body of water.

50. A water harvesting device for harvesting food product from a body of water comprising:
   a) a flotation device;
   b) a collection basket at least partially submerged in a body of water and attached to said flotation device; and
   c) a food-product collection ramp attached to said collection basket for diverting food-product directly from said body of water into said collection basket.

51. The water harvesting device according to claim 50 further comprising a raising and lowering means for collecting food product at different elevational levels in said body of water.

* * * * *